United States Patent [19]

Dennis

[11] 3,800,144
[45] Mar. 26, 1974

[54] NUCLEAR GUIDANCE SYSTEM FOR CONTROLLING AIRCRAFT LANDINGS

[76] Inventor: Roderick A. Dennis, 1516 Xavier, Denver, Colo. 80204

[22] Filed: Feb. 19, 1971

[21] Appl. No.: 116,932

[52] U.S. Cl. ......250/362, 250/106 VC, 250/363
[51] Int. Cl. ............................................. G01t 1/16
[58] Field of Search .... 250/83.3 R, 83.6 R, 106 VC

[56] References Cited
UNITED STATES PATENTS

| | | | |
|---|---|---|---|
| 3,403,254 | 9/1968 | Campanella................. | 250/106 VC |
| 3,403,255 | 9/1968 | Campanella.............. | 250/106 VC X |
| 2,992,330 | 7/1961 | Cooper et al. ........... | 250/106 VC X |
| 3,404,276 | 10/1968 | Campanella............. | 250/106 VC X |
| 3,665,198 | 5/1972 | Barstad .................... | 250/106 VC X |

*Primary Examiner*—Archie R. Borchelt
*Attorney, Agent, or Firm*—Giles C. Clegg, Jr.

[57] ABSTRACT

There is disclosed a nuclear guidance system for positively controlling aircraft landings even under zero visibility conditions. The system provides three series of radiation beacons indicating glide path, distance-to-go, and altitude information. A relatively simple, economical detection system on board the aircraft sorts the information into its appropriate categories and through instruments displays the plane's position relative to the landing area.

21 Claims, 20 Drawing Figures

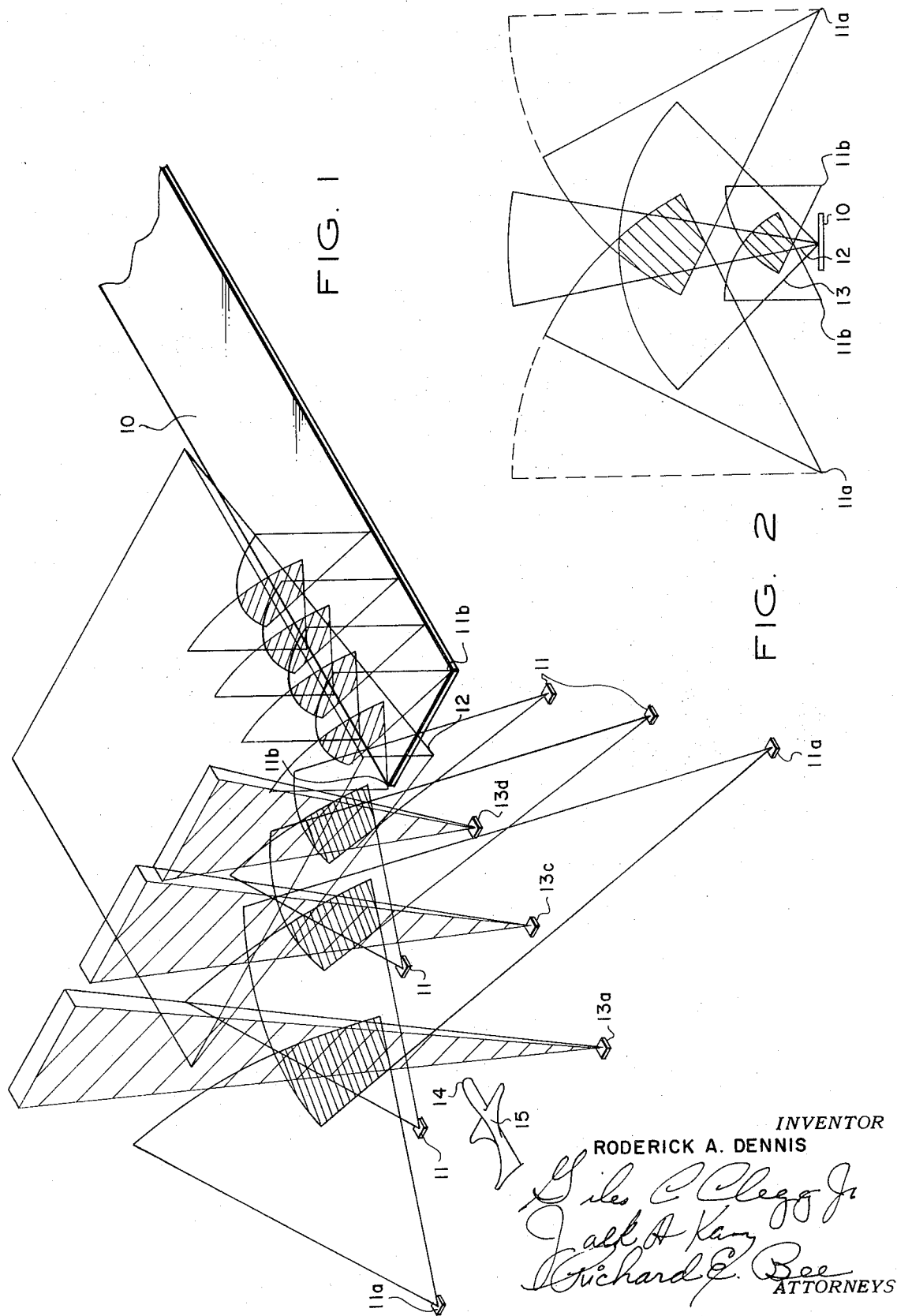

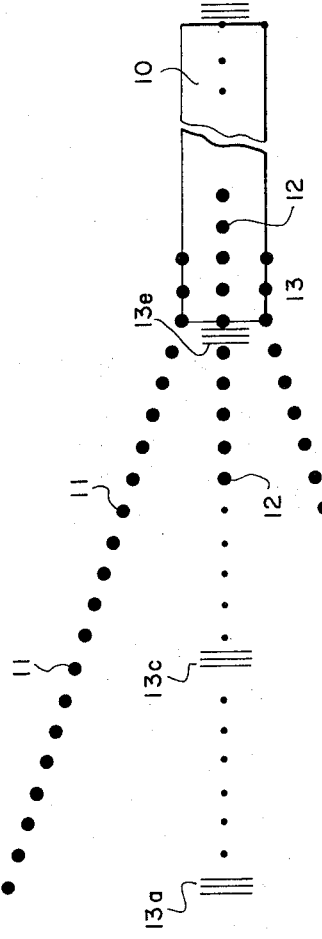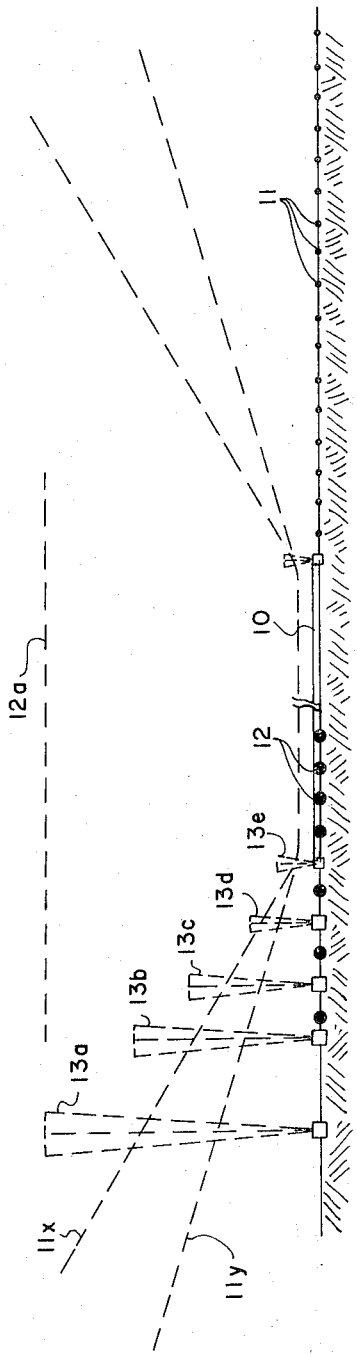

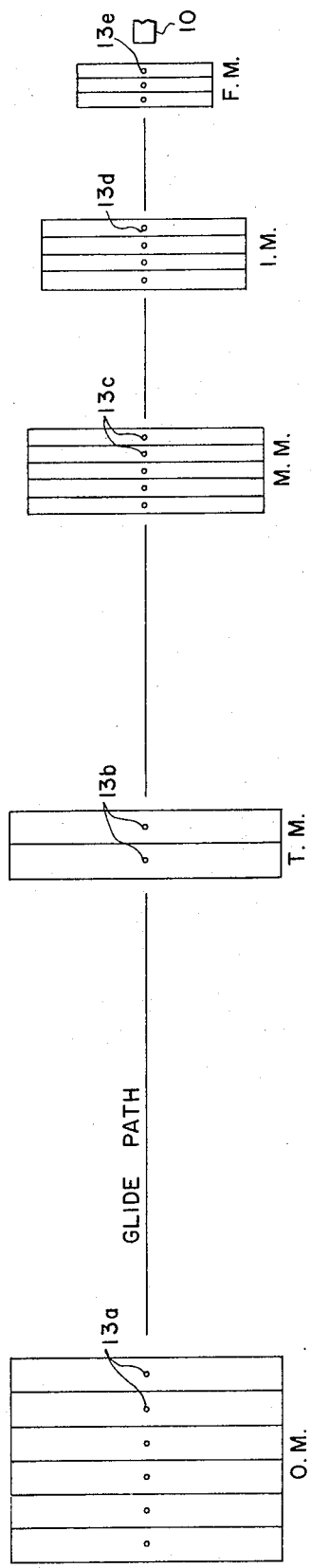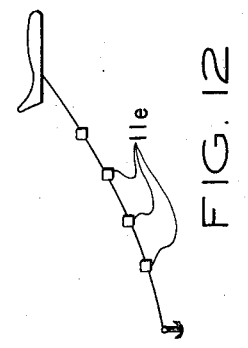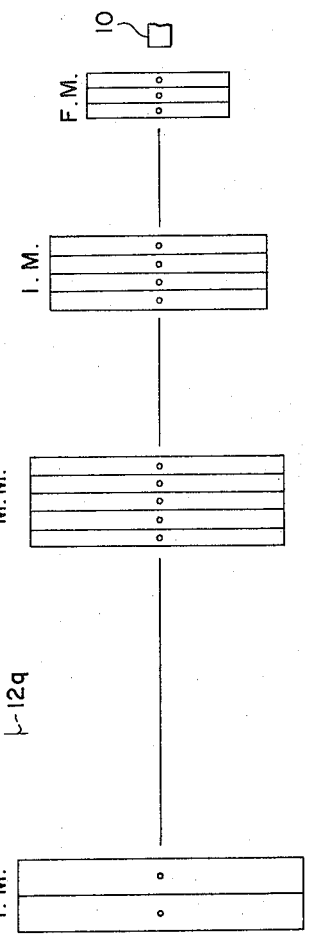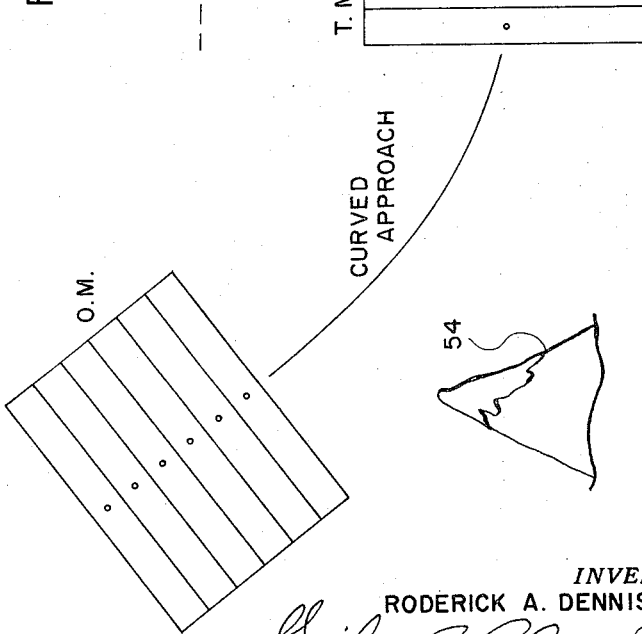

FIG. 9A
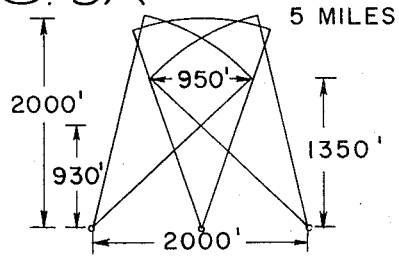
FIG. 9B
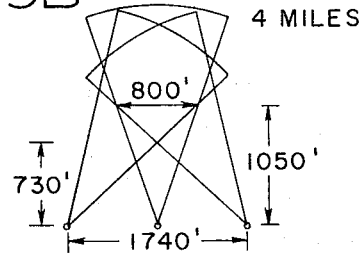
FIG. 9C
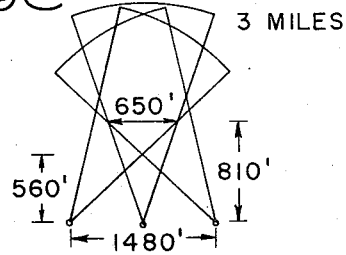
FIG. 9D
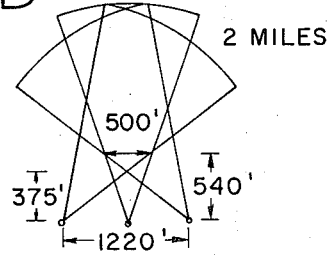
FIG. 9E
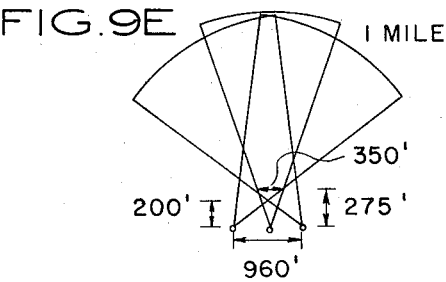
FIG. 10A  OUTER MARKER
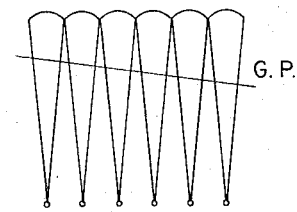
FIG. 10B  MIDDLE MARKER
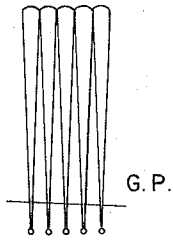
FIG. 10C  INNER MARKER
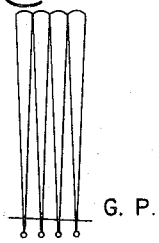
FIG. 10D  FLARE MARKER
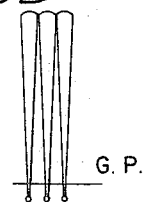
FIG. 10E  ALTITUDE
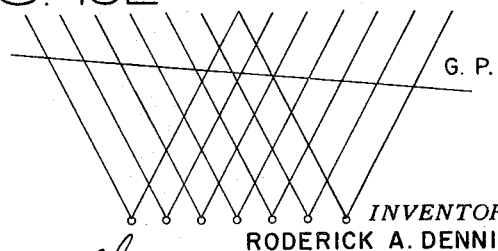
INVENTOR
RODERICK A. DENNIS
ATTORNEYS

NUCLEAR GUIDANCE SYSTEM FOR CONTROLLING AIRCRAFT LANDINGS

This invention relates to aircraft guidance and more particularly to a nuclear landing system for guidance of aircraft into airports.

With increased air traffic there is a greater need for new and better air traffic control patterns fully utilizing the contribution of advanced technologies and mechanisms. One of the major causes of airplane crashes is the unreliability of the normal guide path systems for approaching and, particularly, touchdown upon runways. One of the problems in terms of a glide path system is that it must not only be technically feasible but have a reasonable cost for purchasing, installing and maintaining the system. There are more than 500 air carrier served airports and more than 2,000 air carrier aircraft in addition to thousands of smaller airports and over 130,000 general aviation and military aircraft potentially involved in any transistion to a new system and/or equipment. Additionally, there is the question of compatability with future overall air traffic control systems. This great need existing, it is significant that the system add to the potential safety of aircraft without necessarily eliminating or rendering completely obsolete systems already in use.

One of the major problems in the landing of an aircraft under the present standard ILS (Instrument Landing System) is that this system is unreliable below 300 feet in altitude. Yet, at this time the landing of the aircraft is at an extremely critical phase. Below 100 feet is the most critical since at that point aborting of the landing for a go-a-round becomes difficult, if not impossible. Thus, while the aircraft is still more than 100 feet above runway level should there be a failure of the landing system, go-a-round could be initiated and landing be aborted with no hazard to safety because of the ground system. However, in the most critical phase, below 100 feet, the aircraft is initiating flare and may begin use of a radar altimeter and flare computer as a prime source of vertical reference and command. Glide slope information will still be required but not for this completely critical phase of the landing. Because of the unreliability of these control systems, it will be noted that during the critical phase of the landing, i.e., below 100 feet, standard systems require visual contact by the pilot with the ground in order to successfully accomplish the landing. Thus, under standard FAA Rules, a 300 foot ceiling is required for any landing under standard ILS systems and, under most conditions, the FAA requires an 800 foot ceiling for any landings. Because of this requirement, airports are shut in for a major amount of time.

To overcome many of the aforementioned difficulties, it is therefore an object of this invention to provide an all-weather landing system which provides a nuclear radiation pattern to provide glide slope, altitude and distance-to-go information in a manner which cannot be shut down by ground failures such as failure of power supplies, operator failure, etc.

This invention provides a new type of aircraft guidance system in which the only really active elements are airborne. The ground equipment consists of natural or manufactured radioactive gamma sources requiring no power or maintenance, having a degree of portability and a long, accurately predictable, life. This system will accurately control approach and landing to altitudes below those possible with presently used systems such as ILS, GCA and others.

The most important advantage of the nuclear landing system in accordance with the invention is that its accuracy increases as touchdown is approached. The system uses radioactive isotopes as the gamma radiation source, thus, eliminating installation of all electronic parts with their requirements for environmental control, maintenance, and operating power.

The nuclear landing system further eliminates all requirements for radio spectrum space and is virtually non-jammable. By proper placement and use of different sources, there is no interference between neighboring nuclear landing system runways and multiple glide paths are available. The economy of installation and maintenance is greatly enhanced as compared with electronic systems. The system further uses radioactive sources which are within the AEC approved policies and present no health hazard.

In the system, there is a series of pairs of radioactive sources based at regular intervals from the start of the glide path about five miles from the end of the runway to the end of and boardering the entire runway. The activity of each source may be reduced as the end of the runway is approached so that a signal of fixed intensity is received in the aircraft as its altitude decreases in the glide path or, alternatively, each beacon may be of the same intensity. A second series of equally spaced gamma sources of equal intensity is centered in the runway and runway approach at a point beginning at least 15,000 feet from the runway to a point about one-half down the length of the runway. Reference to this second series of sources gives an accurate altitude measurement during the flareout and touchdown. A third series of beacons yields distance-to-go information. These three series may be of the same isotope and give glide path, altitude control, and distance-to-go information of a factor of intensity. Preferably, each series is of a different isotope and hence each set of information is readily separated. In the utilization of the system, the aircraft would be guided to the start of the nuclear landing glide path by conventional devices. A distance-to-go signal indicates the start of the nuclear landing system glide path and the directional detectors are used to guide the aircraft down the glide path. When the end of the runway is crossed another distance-to-go signal indicates the flare point. The group of altitude radiation sources centered on the runway and runway approach gives increasingly accurate altitude measurements during approach, flare-out and touchdown.

The prior art has previously suggested landing systems utilizing nuclear radiation sources as markers or beacons. However, such systems become uneconomic for general use since they require a large amount of onboard computational equipment. For example, U. S. Pat. No. 2,992,330, Cooper et al, suggests the use of radiation patterns forming an inverted pyramidal shape of three sides, thus aircraft flying through the pyramidal zones would detect the width of these zones and with a computer determine its position by comparing the detected width against a predetermined program. Similar systems requiring highly sophistocated onboard computer equipment are disclosed in U. S. Pat. Nos. 3,403,254; 3,403,255 and 3,404,676, Capanello. It is the primary object of this invention to provide a zero visability landing system which reduces and minimizes the amount and sophistication of the on-board equipment required to operate accurately within the landing system.

In accordance with the object of the invention there is provided a nuclear landing system comprising a first group of positional radiation sources for determining the glide path of the aircraft. A second group of beacons is provided to determine with high accuracy the altitude of the aircraft and a third group of beacons to provide the distance-to-go information. A relatively simple signal detector and processor unit aboard the aircraft yields positive landing information for the pilot.

Further objects and advantages of the invention will be understood from the following specification and the drawings, wherein:

FIG. 1 is a perspective view showing generally the radiation patterns for directing aircraft to a zero visability landing;

FIG. 2 is an end elevation of FIG. 1;

FIG. 3 is a plan view of one embodiment of the invention;

FIG. 4 is a side elevation view of FIG. 3;

FIG. 7 is a plan view of the distance-to-go beacons for a straight approach;

FIG. 8 is a plan view of the distance-to-go beacons for a curved approach;

FIGS. 9a – 9e are end elevational views depicting the radiation patterns of the altitude and positional beacons at various distances from the end of the runway;

FIGS. 10a – 10e are side elevational views of various information beacons; and

FIGS. 11 and 12 are further embodiments of the invention.

Figure 5:
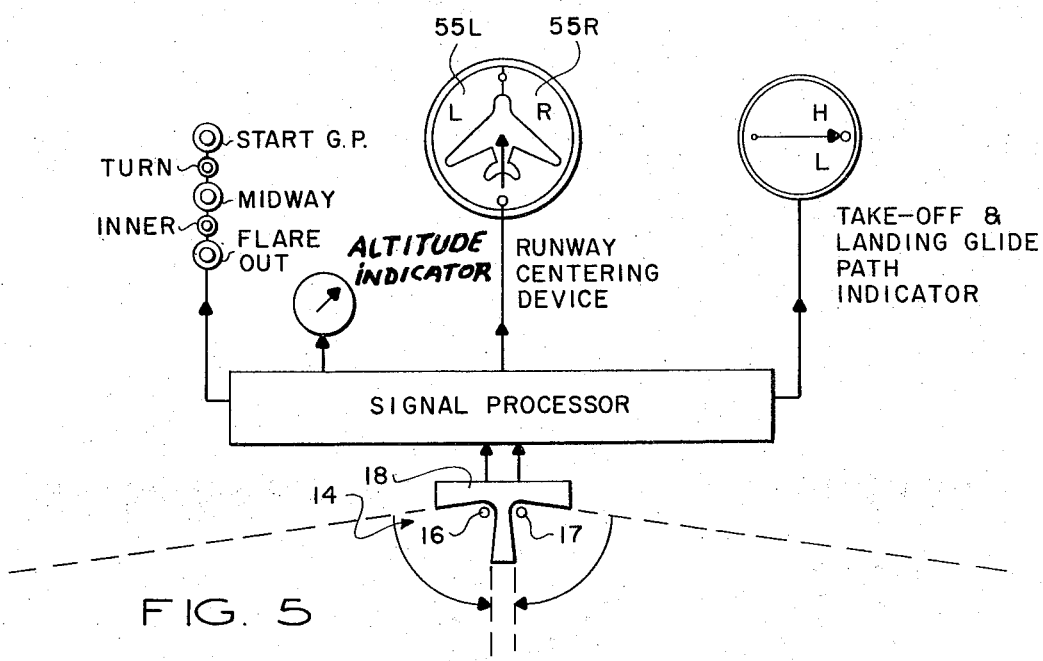
FIG. 5 is a generalized view schematic of the on-board detection and processor system.

Referring now to FIG. 1, the nuclear landing system, in accordance with the invention, for a runway 10 includes glide path or positional beacons 11 arranged in pairs on either side of the runway approach. Each pair of beacons 11 emit generally planar fans of radiation in pairs intersecting to define the glid path. A series of altitude beacons 12 emitting inverted pyramids of radiation and distance markers 13 emitting wedges of radiation are positioned directly beneath the desired glide path.

While the sets of beacons may be of the same radiation source material, it is preferred that they be of different material. For example, the altitude 12 beacons may be of radium, the position beacons 11 of cobalt 60 and the distance-to-go markers 13 of cesium 137.

The intersecting nature of the radiation from the various sets of beacons is indicated in FIG. 2 wherein it will be noted that beacons 12 and 13 direct fans of radiation in a vertical direction along the glide path while the beacons 11 direct radiation patterns from either side of the approach path to define fans of radiation which intersect each other at progressively lower altitudes. Thus, the beacons 11A are considered to be beacons at some distance from the end of the runway with their fans of radiation intersecting at a relatively high altitude, e.g., 1000 feet. The fans of radiation from the beacons 11b at or near the end of the runway intersect at a low altitude, e.g., 25 feet.

A detection system 14 on board the aircraft 15 (FIG. 1) detects the radiation from the various groups of beacons, separates the radiation into various informational patterns and provides for positive control of the aircraft to landing under even zero visibility conditions.

The location of the beacons relative to runway 10 as depicted more particularly in FIGS. 3 and 4. The distance-to-go beacons are shown as a first outer-marker beacon 13a, a turn-marker beacon 13b, a middle-marker beacon 13c, an inner-marker 13d and a flare-marker beacon 13e adjacent the end of the runway 10. Each of these beacons are placed along the center line of the approach path to the runway and set at a predetermined distance from the end of the runway to indicate exactly where the airplane is relative thereto. Also, positioned beneath the approach path for the aircraft is a series of beacons 12 which indicate the altitude of the aircraft, which beacons define an upper altitude limit 12e. The approach path position markers 11 are arranged in a flaring pattern so that the crossing and intersecting radiation therefrom will be initially in a relatively broad pattern. This broad pattern will be relatively easy to locate, particularly since it is assumed that the aircraft will be already equipped with ILS equipment for locating its altitude relative to the runway. The beacons 11 taper down to being located immediately adjacent to the sides of the runway for a more positive indication of the aircraft position and defining a glide slipe tunnel by upper and lower glide path limits 11x and 11y. Alternatively, the beacons 11 may have vertical outside parameters to broaden the area of control, if required by the FAA, as indicated by the dotted lines in FIG. 2. As indicated in FIG. 4, beacons of constantly decreasing intensity may be utilized in the pattern, thus, limiting the potential radiation hazard although such hazard is at worst minimal even with the most intense sources contemplated by the invention.

Figure 6:
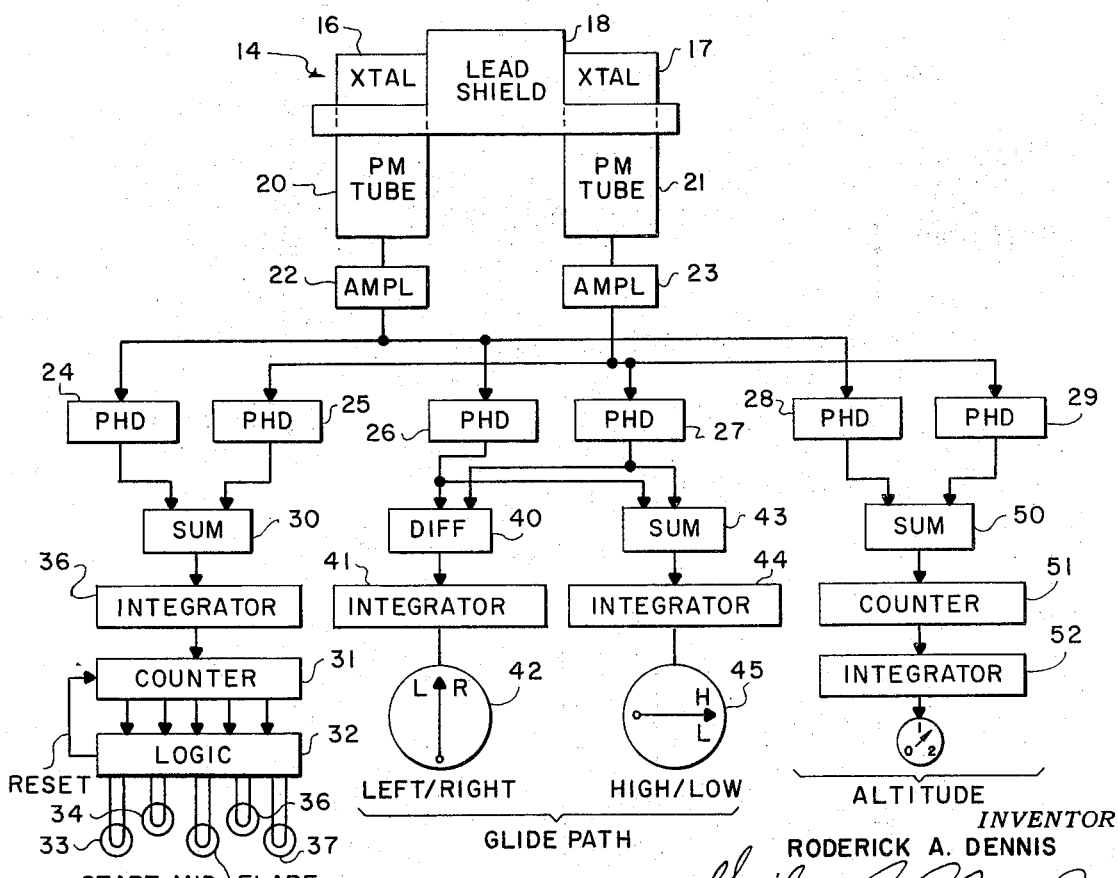
FIG. 6 is a schematic circuit diagram of the processor.

The on-board nuclear detection system is shown more particularly in FIGS. 5 and 6. Thus, the nuclear detection system 14 includes scintillation crystal detectors 16 and 17 separated by a T-shaped shield member 18. The outputs of the scintillation crystal detectors 16 and 17 are connected to a signal processor 19 which in turn is connected to various outputs on the instrument panel on the aircraft 15 which are viewed by the pilot to indicate the plane's relative position. The signal processor 19 is shown more particularly in FIG. 6 and comprises photomultiplier tubes 20 and 21 connected to scintillation crystal detectors 16 and 17 respectively. The output of the photomultiplier tubes is amplified by amplifiers 22 and 23 and directed to a group of pulse detectors 24, 25, 26, 27, 28 and 29 to provide distance-to-go glide path and altitude information as indicated.

Thus, the output of pulse height detectors 24 and 25 are summed by circuit 30 which sum may be utilized to set a counter circuit 31 and with the use of a program logic card 32 indicate the relative position of the aircraft relative to the end of the runway by lighting sequentially neon lamps 33 to 37 to indicate the start of the glide path, the mid-markers (turn, middle and inner) thereof, and the point at which flare-out is to take place, respectively. Depending on the nature of the radiation and the output desired to provide an instrument indication to the pilot, an integrator circuit 38 may be provided to provide a more analog form of information signal.

The output of pulse height detectors 26 and 27 are compared by a difference circuit 40 which is directed to integrator circuit 41 to drive the right-left indicator gauge 42. The output of pulse height detectors 26 and 27 is also summed by circuit 43 which is integrated by integrator circuit 44 which drives a high-low gauge 45.

The output from pulse height detectors 28 and 29 is summed by circuit 50, counted by circuit 51 and integrated by circuit 52 to form an analog (or digital, if desired) signal to drive an altitude indicating gauge 53. Indicator light panels 55R and 55L are provided to indicate that the system is operating and that the plane is on course (see FIG. 5).

While in the foregoing it has been assumed that each of the sets of beacons 11, 12 and 13 are of a different energy band for differentiation between sets it will be noted that all of the beacons may be in the same energy band, hence eliminating the need for the pulse height detectors since the relative and absolute intensity alone may be utilized to indicate the position of the aircraft relative to the runway.

However, preferably the altitude beacons 12 utilize a radium source because of its long half-life for a more constant intensity providing precise measurement of altitude. The approach path or glide path position markers 11 are preferably of a cobalt 60 radiation source, while the distance-to-go markers 13 are of a cesium 137 source so that the radiation from the sources may be readily detected and differentiated by the onboard system.

A more sophisticated distance-to-go series of beacons is depicted in FIG. 7 and comprises six outer marker (OM) distance-to-go beacons 13, five beacons for indicating the mid-point or middle marker (MM) position of the glide path; four distance-to-go beacons 13 to indicate the inner-marker (IM) point a fixed distance from the end of the runway 10 and a group (FM) of three distance-to-go markers 13 positively indicating the point at which the aircraft should begin its flare or leveling off procedure. Two distance-to-go markers 13 are utilized to form a turn marker (TM) which by regulation is the last point at which the aircraft can turn out of its approach pattern without fly-by. The system may be adapted as depicted in FIG. 8 to a curved approach system necessary for some airports as when an obstruction 54 is present. Thus the outer markers (OM) may be placed not necessarily directly in alignment with the center line of the runway 10 but may be at an angle thereto which is predetermined and shown on the aircraft landing charts.

The radiation pattern to be detected by the detector system 14 on board the aircraft are more specifically depicted in FIGS. 9 – 10. FIGS. 9a to 9e depict the radiation patterns for the approach position markers 11 and altitude markers 12 at various distances from the end of the runway. In all cases the intensity of the sources is set so that useful radiation levels extend to 2000 feet which altitude is well above the altitude of an aircraft approaching a runway for landing. At a distance of five miles (FIG. 9a) the position markers 11 are 2,000 feet apart and set to cross each other at a height of 930 feet, thus forming a radiation pattern approximately 950 feet wide in which the aircraft will detect sufficient signals to indicate its whereabouts. At a distance of 4 miles (FIG. 9b) the position markers 11 cross at an altitude of 730 feet and define a radiation pattern 800 feet wide at a height of 1050 feet since the markers are spaced 1740 feet apart. At a distance of three miles (FIG. 9c) the markers 11 are placed 1480 feet apart to cross at a height of 560 feet defining a path 650 feet wide at the altitude of 810 feet assumed for the aircraft on a proper approach. Similarly, at a distance of 2 miles the markers 11 are spaced 1220 feet apart to cross at a height of 375 feet to define a corridor 500 feet wide at an altitude of 540 feet and at a distance of 1 mile (FIG. 9e) the markers 11 are spaced 960 feet apart to cross at a height of 200 feet, hence defining a corridor 350 feet wide at an altitude of 275 feet.

The distance-to-go markers are schematically depicted in FIGS. 10a – 10d and show the outer marker being defined by a series of six beacons 13 which will be defined and counted as six pulses to indicate a relative distance to the end of the runway. Similarly, the middle marker is indicated by a series of five beacons 13, the inner-marker by a series of four beacons and the flare marker a series of 3 radiation fans which are clearly detectable while the aircraft approaches the end of the runway.

The altitude markers 12 which indicates altitude as a measure of absolute intensity are set in a series of over-lapping patterns as depicted in FIG. 10e. Only a portion of the series of markers 12 are shown but it will indicate that the markers are set closely enough together with a wide conical spread of radiation so that the radiation integrates from the various beacons and therefore a relative absolute intensity is readily detected at any point in the glide path. It is to be further noted that all beacons in the altitude series 12 are depicted as of a constant intensity. However such intensity could be graded such that the same relative intensity would indicate a gradually decreasing altitude and be depicted as such by the altitude gauge with a suitable servo driving circuit for the integrator 52.

From the foregoing and referring back to FIG. 6, it will thus be understood that the detection system on board the aircraft operates in the manner previously described. Detection of the radiation, for example, from the distance-to-go beacons 13 which are, because of their particular energy level, sensed by pulse height detectors 24 and 25, summed and provide a definite pulse count for the counter 31. The count indicates the number of beacons which have been counted, thus, lighting either the start-of-glide path, mid-point or flare-out signal for information of the aircraft operator. Similarly, the radiation from the altitude markers are segregated by the pulse height detectors 27 and 28, summed by the circuit 50 to indicate its absolute intensity thus providing a signal to counter circuit 51. The integrator 52 then provides an analog signal which drives the altitude gauge 53. Since the radiation from the altitude beacons 12 is proportional to the inverse square of the distance, the larger the signal from the integrator circuit 52 the lower the indicated altitude. The radiation from the position beacons 11 is detected by the pulse height detectors 26 and 27 and indicates whether the aircraft is to the right or to the left by the difference in relative intensity detected at circuit 40. Since the maximum radiation from the position markers 11 will be noted to be at their cross-over points whether or not the aircraft is high or low in its glide path will be indicated by the sum of the two intensities as determined by circuit 43. Thus, the integrator circuit 44 will be set at a level which is slightly less than the maximum intensity of radiation at the cross-over point of the two position markers being detected. If the absolute intensity of this radiation rises slightly the gauge 45 will indicate that the plane is low relative to the predetermined glide path. As intensity drops off, the gauge 45 will indicate the plane is high relative to its desired glide path. If the intensity drops abruptly as when the plane might go far below its ordinary glide path and be out of the range of the crossing of the position markers, the plane would be too low to have a proper approach and must abort the landing.

If desired, it will be apparent that the signals derived from the detection system may be utilized for automatic landings by provision of suitable on-board equipment to connect the system to the auto-pilot.

While the invention has been specifically described in relation to standard aircraft, it will be readily apparent that the system, as described, can be advantageously utilized by vertical take-off and landing aircraft as well. A simplified airport installation specifically designed for these aircraft is depicted in FIG. 11 and comprises a group of a over-lapping nuclear beacons arranged in a clover leaf pattern. Thus, a helicopter could sense the four perimeter beacons 12x from any direction, circle until finding equal left and right sources and land on the central one 12y, which beacon may be of any radiation source to indicate mainly altitude.

A non-fixed system can also be contemplated within the scope of the present invention as shown in FIG. 12. This system comprises a series of beacons 11 connected in string with a weighting or anchoring means 60 on one or both ends. This system could be dropped by air or deployed temporarily by ground personnel and serve to guide aircraft to particular locales or even to land if arranged adjacent an area suitable for this purpose.

It will thus be seen that there is provided a system which provides for zero visability landing of aircraft wherein the installation on the ground approaching the runway is in a predetermined fixed pattern which may be detected and discerned into useful information by relatively simple on-board detection equipment and eliminating the necessity for a relatively large computer structure which increases the cost and weight to the aircraft.

While the invention has been disclosed by the preferred embodiments thereof, it will be appreciated that certain modifications and changes may be made therein without departing from the spirit and scope of the invention.

What is claimed is:

1. A method of guiding an aircraft along a predetermined glide path to a landing field with the use of sources of penetrative radiation comprising the steps of:

Providing a plurality of pairs of radiation sources along the glide path at predetermined spacings with sources of each pair being disposed on opposite sides of the glide path, Shaping the radiation beam from each source to be a fan shape configuration and sufficiently planar that the beams from adjacent pairs do not intersect at the altitudes of interest, Positioning sources of each pair to cause the pair of beams to intersect at first pre-determined elevations and to produce windows at which radiation from both beams is present, Said glide path passing through each said window at respective second elevations above the point of intersection of said beams;

Providing on an aircraft to be guided detector means for detecting the intensity of radiation present from each source of a pair as the aircraft passes through each window, and determining whether the aircraft is to the left or right of the glide path as a function of the difference in intensities of radiation detected from each source of the pair forming the window through which the aircraft is passing.

2. A method as defined in claim 1 further including the step of progressively decreasing the separation between the source pairs for successive pairs of sources to lower the elevation at which the beams intersect and narrow the width of the window at the glide path altitude.

3. A method as defined in claim 2 further including the step of maneuvering the aircraft along a flight path to pass through each window at a position to receive a pre-determined amount of radiation from each of the pairs of sources producing said window thereby maintaining the aircraft on the pre-determined glide path.

4. A method as defined in claim 1 further including the step of providing along the glide slope a plurality of first additional sources of radiation, shaping the beams of radiation from said first additional sources to be of generally inverted pyramidal shape and directed vertically upward and positioning said sources sufficiently close that the beams of radiation overlap.

5. A method as defined in claim 4 further including the step of determining altitudes of the aircraft as a function of radiation present from said first additional sources.

6. A method as defined in claim 1 further including the step of positioning along the glide path at predetermined distances from the landing field second additional sources of radiation, shaping the beams of radiation from said second additional sources to be a thin, wedge configuration, sufficiently planar that the beams of radiation from adjacent ones of the second additional sources do not overlap and obtaining a measure of the relative distances to the end of the runway by determining which of the beams from the second additional sources the aircraft is passing through.

7. A method as defined in claim 1 further including the step of positioning along the glide path at predetermined distances from the landing field groups of additional sources of radiation, shaping the beams of radiation from each source to be of a configuration sufficiently planar that beams of radiation from adjacent additional sources do not overlap at the altitude the glide path passes through a beam, and counting the number of beams in a group the aircraft passes through to determine the distance of the aircraft to the landing field.

8. A landing system for guiding an aircraft along a pre-determined glide path to a landing field comprising:

A plurality of pairs of radiation sources positioned at pre-determined points along and underneath the glide path with each pair of sources being disposed on opposite sides of the glide path;

means for shaping the beams of radiation from said pairs of sources to be sufficiently planar that the beams from adjacent pairs do not intersect at altitudes of interest and to be of a generally fan shape;

the sources of each pair being positioned to cause their beams to intersect below the glide path and produce a window at which radiation from both beams is present, the glide path passing through the window; and a plurality of second radiation sources positioned under the glide path and along its length for directing upward beams of radiation of known intensity from which altitude information can be obtained by an aircraft carrying detection means responsive to the intensity of radiation from said second sources.

9. A system as defined in claim 8 wherein both sources of a pair of radiation sources are of the same material which is different from the material of said second radiation sources.

10. A system as defined in claim 8 wherein the spacing between the sources of each of said pairs progressively decreases along the glide path toward the landing field for successive pairs of sources to lower the elevation at which the beams intersect and narrow the width of the window at the glide path altitude.

11. A system as defined in claim 8 including means for shaping the beams from said second radiation sources to be of an inverted pyramidal shape.

12. A system as defined in claim 8 further including additional radiation sources positioned at points predetermined distances away from the landing field along and under the glide path from which distance to landing field information can be obtained by an aircraft carrying detection equipment flying along the glide path.

13. A system as defined in claim 12 wherein a different number of sources is provided at each point and the beam from each source is sufficiently planar that adjacent beams do not overlap at the altitude of the glide path over each point.

14. A system as defined in claim 12 wherein the additional radiation sources are of a material different from the pairs of radiation sources and the second radiation sources.

15. A system as defined in claim 8 further including detection means mounted on an aircraft to be guided for detecting as the aircraft passes through a window the intensity of radiation present from the two beams forming the window and determining whether the aircraft is to the left or right of the glide path as a function of the difference in intensities of radiation detected from each source of the pairs forming the window through which the aircraft is passing.

16. A system as defined in claim 15 wherein said detection means includes means for continuously measuring the intensities of radiation at the aircraft and producing a signal responsive to the deviation of the aircraft from a glide path altitude and a signal responsive to deviation of said aircraft from the glide path horizontal position.

17. A system as defined in claim 16 further including means responsive to said signals for indicating position of the aircraft relative to the glide path.

18. A system as defined in claim 15 wherein said detection means includes a first fixed directional detector means on said aircraft having a first pointing axis in a plane perpendicular to the flight of path of a aircraft, the second fixed directional detector means on said aircraft having a second pointing axis in a plane perpendicular to the direction of the flight path of the aircraft and means on said aircraft for determining the relative difference in intensity between the radiation detected by said two detectors for assisting in guiding of said aircraft.

19. A system as defined in claim 15 wherein said detection means includes a radiation sensing means and a pulse height detection means for deriving information as to the position of the aircraft relative to the glide path.

20. A system as defined in claim 14 further including detection means carried by the aircraft for determining the position of the aircraft relative to the glide path comprising a scintillation crystal detector adapted to be activated by radiation impinging thereon, pulse height detector circuit means for separating the information received from said detectors into its appropriate categories; a count rate circuit adapted to be energized by said separated information for indicating the altitude of said aircraft, its position in a horizontal and vertical direction realtive to the glide path and its position relative to the end of the runway whereby said aircraft can be safely landed within said desired landing area according to the determined position of said aircraft.

21. A system as defined in claim 8 wherein the intensity of the pairs of radiation sources progressively decreases along the glide path toward the landing field.

* * * * *